D. D. STELLE.
Combined Planter, Harrow, and Cultivator.
No. 3,173. Reissued Oct. 27, 1868.
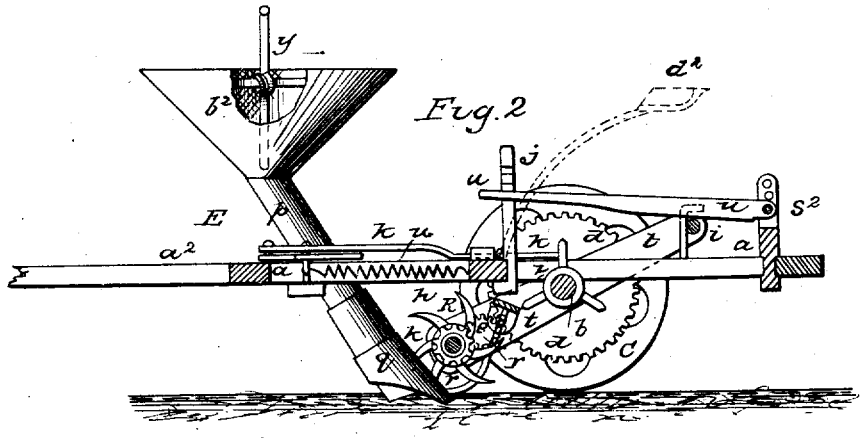
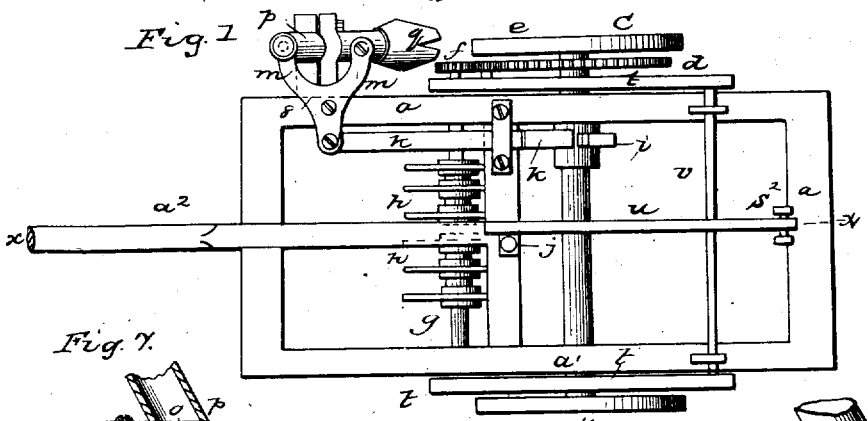
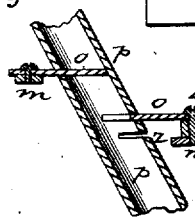
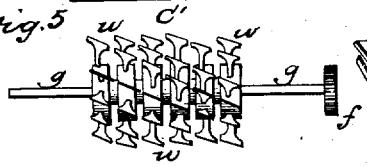
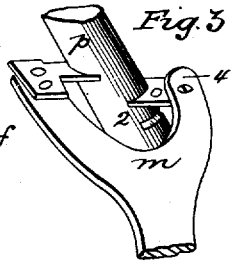
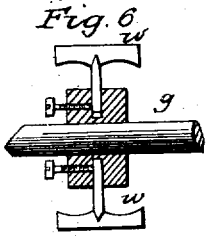
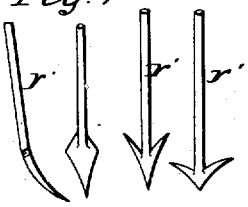
Witnesses
W. H. Bishop
Andrew De Lay
Inventor
D. D. Stelle
By attorney
J. H. McIntire
N. PETERS, Photo-Lithographer, Washington, D. C.

UNITED STATES PATENT OFFICE.

PETER P. RUNYON, JOHNSON LETSON, GEORGE J. JANEWAY, AND T. E. McDONALD, OF NEW BRUNSWICK, NEW JERSEY, (ASSIGNEES, BY MESNE ASSIGNMENTS, OF DAVID D. STELLE,) ASSIGNORS TO PETER P. RUNYON, JOHNSON LETSON, AND GEORGE J. JANEWAY.

IMPROVEMENT IN COMBINED PLANTER, HARROW, AND CULTIVATOR.

Specification forming part of Letters Patent No. 66,904, dated July 16, 1867; Reissue No. 3,173, dated October 27, 1868.

*To all whom it may concern:*

Be it known that DAVID D. STELLE, of New Brunswick, in the county of Middlesex and State of New Jersey, invented certain new and useful Improvements in Combined Planter, Harrow, and Cultivator; and we do hereby declare that the following is a full, clear, and exact description thereof, reference being had to the accompanying drawings and the letters of reference marked thereon, and making a part of this specification.

In the accompanying drawings, Figure 1 is a top view of one of the improved machines. Fig. 2 is a vertical section of the same at *x x*, Fig. 1. Fig. 3 is a detail view, (enlarged scale,) illustrating particularly the corn-dropping mechanism; Fig. 4, detail view, showing harrows; Fig. 5, detail view of cultivator-cylinder; Fig. 6, detail sectional view, showing mode of securing the hoes to hubs. Fig. 7 is a detail sectional view of corn-dropping tube and its adjustable valves or slides.

In the several figures the same parts are designated by the same letters of reference.

*a* is the main frame of the machine, which is hung or mounted on the main axle *b*, provided with ground-wheels C C, and $a^2$ is the pole or shaft by means of which the machine is drawn.

On the main axle *b* is hung a vibratory or rocking frame, *t*, in the lower end of which is arranged a shaft, *g*, in which are mounted the cultivators, (or harrows, as the case may be,) and which is provided at one end with a spur-pinion, *f*, meshing into an intermediate pinion, *e*, which in turn meshes into the main driving-gear *d*, which is keyed on the main axle *b*. The upper rear ends of arms *t* are connected by a cross-rod, *v*, against which the lower side of a lever, *u*, presses. This lever *u* is pivoted at its rear end in a standard, $s^2$, (see Figs. 1 and 2,) and is arranged to catch into a notched standard, *j*, near its forward end, for purposes to be explained presently.

*p* is the corn-planter tube, which is supplied from a hopper, $b^2$, in red lines, provided with a suitable agitator, *y*. On the lower end of tube *p* is a coverer, *q*, and within the tube *p* work valves *o o*, (see Figs. 3 and 7,) which are manipulated by means of a vibratory bifurcated arm, *m*, pivoted to the main frame *a* at 8, and vibrated in one direction by rod *k* and in the opposite direction by spring *n*. The arm *k* is moved forward by means of a cam or tappet wheel, *i*, on shaft *b*. On the shaft *g* are arranged and secured a series of hubs, in which are radiating arms or teeth *h*, arranged spirally relatively to the shaft, and from a cross-bar, *s*, extend downward stationary teeth *r*.

The operation of the machine will be understood to be as follows, viz: As the machine is drawn along by the team, (the driver seated at $d^2$,) the rotation of the main ground-wheel C, carrying with it the driving-gear *d*, effects the rotation of the pinion *e*, and through it that pinion *f* and shaft *g* which carry the cultivator or harrow, so that during the passage of the machine over the ground the spirally-arranged series of teeth *h* is rotated, and digging into thoroughly disintegrates the earth, the clods of ground being broken thoroughly against the stationary arms or teeth *r*. The depth to which the rotating teeth shall penetrate the ground is regulated by raising and lowering the forward end of the oscillatory frame *t*, and this is accomplished by the driver taking hold of the forward end of lever *u* and setting it (in the holding-notches of standard *j*) higher or lower. If the lever *u* be depressed, turning on its fulcrum at $s^2$, it will bear down on the cross-bar *v* and depress the rear end of frame *t*, and consequently elevate the cultivator, and if said lever *u* be raised it will permit the ascent of rear end of frame *t*, and consequent descent of the cultivator, (by its own gravity,) to penetrate deeper into ground. As the machine is drawn along, the driver, by sufficiently depressing forward end of lever *u*, can raise the cultivator entirely clear of the ground when he wants to turn round, (or for other reasons to have the cultivator clear,) and when it is desired to use only the corn-planting mechanism. As the machine travels along a furrow is made by the foot of the tube *p*, into which a given quantity of corn is dropped at intervals, and at equidistant points, and as the corn is planted it is covered over by the coverer *q*, which closes in the earth over it, and the main wheel C, following in the path of the planter, presses down the earth snugly over the planted and covered corn.

The hopper $b^2$ being full of corn, it will be understood that the vibrations of the bifurcated arm *m* (effected by the reciprocating rod *k* and spring *u*) will alternately move in and out the slides *o o*, whereby a quantity of corn equal to the capacity of the space between said slides *o o* will be each time allowed to pass down through and out at the bottom of the tube *p*; and as the motions of the said slides are effected automatically by the cam or tappet wheel *i* on the main shaft, it follows that the corn will be dropped always at equal distances as the machine travels along, no matter with what speed it is drawn. When it is desired to vary the charge of corn deposited in each hill the slides *o o* are set farther apart, so as to allow a greater or less charge, and when it is desired to run the machine along without planting, the rear end of the rod *k* (which is made with a hinge) is turned up out of the way of and so as to clear the cam *i*. The valve mechanism will then remain closed, (by the tension of the spring *n*,) and the machine may be used for harrowing or cultivating only.

Although only one corn-tube is shown, it is designed that the machine have one on each side. At Figs. 3 and 7 are particularly represented the corn-tube and its valves.

Suppose it is desired to increase the charge or deposit of corn. The screw 4 is taken out, washer *x* removed, slide *o* placed on arm *m*, so as to work in slot No. 2. The washer *x* is then placed on top of slide *o* and screw 4 put back in place. Of course there may be any number of slots; but one or two changes will probably be found sufficient for all practical purposes.

The hubs to which the teeth *h* are secured may be either keyed on shaft *g*, or the latter may be made square, and the hubs with similarly-shaped eyes to fit on; and, if deemed expedient, one or more of said hubs may be removed, near the middle of shaft *g*, to enable the operator to straddle with the other teeth *h* a row of young plants not high enough to be injured by the shaft itself.

At Fig. 5 is particularly shown a set of hoes which may be employed for certain kinds of work, and it will be understood that various kinds of implements may be adjusted upon the shaft *g*, as desired, and to suit the soil and work required.

It will be understood that the machine shown and described may be subjected to modifications, and that portions only may be used, without departing from the spirit of the invention in its several distinct features.

Having fully explained the construction and operation of the several portions of the machine, so that one skilled could make and use it, what is claimed as new, and desired to be secured by Letters Patent, is—

1. The employment, in combination with the main frame and driving-wheels, of a rotatory cultivator (or harrow) arranged forward of the main axle and in a vibratory frame hung on said axle, substantially as described, for the purposes set forth.

2. The employment, in combination with the oscillating frame in which the cultivator is hung, of a lever, *u*, and retaining-bar *j*, or the equivalents, (for depressing the rear end of said frame,) so arranged that it may be conveniently handled by the driver while in his seat, as described.

3. The combination of the rod *k*, spring *n*, and vibratory valve-arm *m* with the cam *i*, the whole arranged to operate as and for the purpose set forth.

4. The adjustable slides and series of slots in tube *p*, for varying the charge of seed to be deposited each time, as and for the purposes set forth.

5. The adaptation to the same transverse cultivator-shaft *g* of different sets of removable harrows and hoes, as described.

In testimony whereof we have hereunto set our hands and seals this 26th day of September, 1868.

PETER P. RUNYON. [L. S.]
JOHNSON LETSON. [L. S.]
GEO. J. JANEWAY. [L. S.]
THOMAS E. McDONALD. [L. S.]

In presence of—
MARTIN NEVIUS,
DAVID C. ENGLISH.